United States Patent [19]
Ohsugi et al.

[11] Patent Number: 5,321,082
[45] Date of Patent: Jun. 14, 1994

[54] CURABLE RESIN COMPOSITION

[75] Inventors: Hiroharu Ohsugi, Hirakata; Yoshio Eguchi, Ikeda, both of Japan

[73] Assignee: Nippon Paint Company, Ltd., Osaka, Japan

[21] Appl. No.: 45,719

[22] Filed: Apr. 14, 1993

[30] Foreign Application Priority Data

Apr. 14, 1992 [JP] Japan ................................ 4-120111

[51] Int. Cl.$^5$ ............................................ C08L 83/05
[52] U.S. Cl. ...................................... 525/101; 525/100; 525/446; 525/480; 525/523; 525/107; 525/119; 525/176
[58] Field of Search ................. 525/29, 100, 446, 480, 525/523, 161; 528/15, 25, 26, 27, 29, 31

[56] References Cited

U.S. PATENT DOCUMENTS

| | | | |
|---|---|---|---|
| 3,445,420 | 5/1969 | Kookootsedes et al. | 528/15 |
| 4,472,562 | 9/1984 | Shirahata | 528/15 |
| 5,010,137 | 4/1991 | Umeda et al. | 525/104 |
| 5,017,654 | 5/1991 | Togashi et al. | 525/100 |
| 5,208,289 | 5/1993 | Takarada | 525/100 |

*Primary Examiner*—Ralph H. Dean
*Attorney, Agent, or Firm*—Townsend & Banta

[57] ABSTRACT

A curable resin composition containing (a) a polymer having a plurality of alkenyl groups, (b) an organohydrogenpolysiloxane having a plurality of hydrosilyl groups, (c) a polymer having a plurality of alkynyl groups, and (d) a hydrosilylation catalyst is disclosed. The composition is stable at room temperature but curable at an elevated temperature.

15 Claims, No Drawings

CURABLE RESIN COMPOSITION

FIELD OF THE INVENTION

This invention relates to a novel curable resin composition, More particularly, it relates to a novel curable resin composition having excellent weatherability and other physico-chemical properties as well as an increased storage stability.

BACKGROUND OF THE INVENTION

Heretofore a variety of curable resin compositions are known in the coating industry including those comprising hydroxyl group containing acrylic or polyester polymers and a crosslinker such as melamine resins or organic polyisocyanates. The melamine resin-crosslinking compositions must suffer not only from volumetric shrinkage upon curing due to the emanation of lower alkanol by-products but also from a decreased weatherability particularly when exposed to acid rain due to the presence of triazine nuclei. The polyisocyanate-crosslinking system has problems of toxicity, decreasing weatherability with time and yellowing.

Japanese Laid Open (Kokai) Patent Application Nos. 36109/82 and 155660/83 disclose a system having an enhanced weatherability comprising room temperature-curable alkoxysilyl group-bearing acrylic polymers. This system has certain defects that the curing reaction proceeds slowly, that the cured product can be blotted with by-products produced by the hydrolysis of residual alkoxysilyl groups and that its rust prevention property is not satisfactory.

Japanese Patent Publication (Kokoku) No. 33152/88 discloses a thermosetting resin system utilizing a reaction between an alkoxysilyl component and a hydroxyl group-containing resin component. This system is also disadvantageous in that its curing reaction proceeds slowly and the resulting cured film exhibits a poor salt spray resistance.

It has long been known in the art to crosslink vinylpolysiloxanes with organohydrogenpolysiloxanes in the presence of a platinum catalyst. Unfortunately, the cured product of this composition is swellable with conventional organic solvents and thus exhibits poor solvent resistance as well as poor alkali resistance. This composition also has a poor overlaying property when used for coating purposes. These defects have precluded the composition from its application to coating compositions of general use.

In addition, the above hydrosilyl reaction by the organohydrogenpolysiloxanes has been utilized to obtain rubbery resilient products by reacting the organohydrogenpolysiloxanes with alkenyl group-bearing polymers and oligomers in the presence of a hydrosilylation catalyst such as chloroplatinic acid. See, Japanese Laid Open Patent Application Nos. 138230/89, 95266/82, 200807/82 and 277645/82.

All of the above compositions are reactive even at room temperature and, therefore, at least the catalyst must be kept separately from the remainder of the compositions immediately prior to use.

Japanese Laid Open Patent Application No. 294320/82 discloses a one-component curable resin composition comprising an alkenyl group-bearing polymer, a hydrosilyl group-bearing compound, a hydrosilylation catalyst and a stabilizing agent such as benzothiazole. However, it has been found that the stabilizing agent disclosed therein dose not fully satisfy with the stability requirements for practical application.

It has been reported in J. Japanese Chem. Soc., 5, 541-546 (1990) that various acetylenic compounds are effective to regulate the hydrosilylation reaction.

We have found that the above problems may be solved by incorporating an alkynyl group-bearing polymer into a curing system containing an alkenyl group-bearing polymer, an organohydrogenepolysiloxane and a hydrosilylation catalyst. By incorporating the alkynyl group-bearing polymer, various properties of the resulting films may be greatly improved including weatherability, solvent resistance, alkali resistance, acid resistance, waterproofness, salt spray resistance, rust preventive property, anti-blotting property and so on. We have also found that when using the above composition for coating purposes, the use of organic solvents may be dispensed with. The present invention has its basis on these findings.

Accordingly, it is an object of this invention to provide a curable resin composition which is excellent in storage stability, weatherability, acid resistance, alkali resistance, waterproofness, salt spray resistance, solvent resistance, overlaying property and so on.

It is another object of this invention to provide a curable resin composition which is curable without volumetric shrinkage and thus may also be used for molding purposes.

It is a further object of this invention to provide a curable resin composition which may be used for coating purposes as solventless or high solids coating compositions.

SUMMARY OF THE INVENTION

The above and other objects may be accomplished by providing, in accordance with this invention, a curable resin composition comprising:
 (a) a polymer having a plurality of alkenyl groups in the molecule and a number average molecular weight from 400 to 100,000;
 (b) an organohydrogenpolysiloxane having a plurality of silicon-hydrogen bonds in the molecule;
 (c) a polymer having a plurality of alkynyl groups in the molecule and a number average molecular weight from 400 to 100,000; and
 (d) a catalycally effective amount of a hydrosilylation catalyst.

The curing mechanism of the above composition mainly utilizes the addition reaction between the alkenyl group and the hydrosilyl group. It is believed that a similar addition takes place between the alkynyl group and the hydrosilyl group. Accordingly, the alkynyl group-bearing polymer (c) plays a role of a reaction inhibitor by complexing to the catalyst at room temperature. However, this inhibitory effect is lost when heating the composition by the dissocation of the complex and both of the alkenyl group-bearing polymer (a) and the alkynyl group-bearing polymer (c) are crosslinked by the reaction with the hydrosilyl compound (b).

DETAILED DESCRIPTION OF THE PREFERRED EMBODIMENT

Polymers or resins usable in this invention as component (a) must have a plurality of alkenyl groups such as vinyl, allyl, methylvinyl, dimethylvinyl, cyclohexenyl or butenyl in the molecule and a number average molecular weight from 400 to 100,000. Preferably, they are alkenyl group-bearing acrylic, polyester, epoxy or polyether resins Alkenyl group-containing acrylic resins may be produced by polymerizing an alkenyl group-containing acrylic monomer alone or in combination with other monomers copolymerizable therewith. Examples of alkenyl group-containing acrylic monomers include allyl (meth)acrylate, 2-butenyl (meth) acrylate, 3-methyl-3-butenyl (meth)acrylate, 3-methyl-2-butenyl (meth)acrylate, cyclohexenylmethyl (meth)acrylate, 2-methyl-2-propenyl (meth)acrylate, 3-heptenyl (meth) acrylate, 4-hexenyl (meth)acrylate, CYCLOMER MF-401 (1:1 adduct of 2-hydroxethyl methacrylate and vinylcyclohexene monoepoxide sold Daicel Chemical Industries, Ltd.) and the like. These alkenyl group-containing monomers may be produced by reacting the corresponding alcohols with (meth) acryloyl chloride or transesterifying with an alkyl (meth) acrylate. Alkenyl group-containing monomers produced by reacting an olefin alcohol with (meth)acryloylisocyanate or 2-isocyanatoethyl (meth)acrylate may also be used.

Examples of other monomers to be copolymerized with the alkenyl group-containing acrylic monomer include, inter alia, acrylic monomers such as methyl (meth)acrylate, ethyl (meth)acrylate, n-butyl (meth)acrylate, isobutyl (meth) acrylate, t-butyl (meth)acrylate, 2-ethylhexyl (meth) acrylate, lauryl (meth)acrylate, phenyl (meth)acrylate, benzyl (meth)acrylate, 2-hydroxyethyl (meth)acrylate, 2-hydroxypropyl (meth)acrylate, 4-hydroxybutyl (meth) acrylate, adduct of 2-hydroxyethyl (meth)acrylate and ε-caprolactone (e.g. PLACCEL FM1 sold by Daicel Chemical Industries, Ltd.), glycidyl (meth)acrylate, 3-trimethoxysilylpropyl (meth)acrylate, 3-triethoxysilylpropyl (meth)acrylate, 3-dimethoxymethylsilylpropyl (meth) acrylate, (meth)acrylic acid, 2-acryloylamino-2-methylpropane sulfonic acid, acid phosphoxypropyl (meth) acrylate, tributyltin (meth)acrylate, (meth)acrylamide, (meth)acryloylisocyanate, 2-isocyanatoethyl (meth)acrylate and the like. Other copolymerizable monomers include styrene, α-methylstyrene, itaconic acid, maleic acid, vinyl acetate, allyl acetate, vinyltrimethoxysilane, vinyltriethoxysilane, vinylmethyldimethoxysilane, vinylmethyldiethoxysilane and the like. These non-acrylic monomers are preferably used in a proportion less than 50% by weight.

Other methods for producing alkenyl group-containing acrylic resins include the reaction of hydroxyl group-containing acrylic resins with isocyanates or carboxylic acid anhydrides having the alkenyl function, the reaction of isocyanato group-containing acrylic resins with olefin alcohols, the reaction of carboxyl group-containing acrylic resins with alkenyl group-containing epoxide compounds, and the reaction of epoxide group-containing acrylic resins with alkenoic acid.

Hydroxyl group-containing acrylic resins may be produced by polymerizing hydroxyl group-containing acrylic monomers such as 2-hydroxyethyl (meth)acrylate, 4-hydroxybutyl (meth)acrylate, or adduct of 2-hydroxyethyl (meth)acrylate and ε-caprolactone ( e.g. PLACCEL FM series), or copolymerizing the hydroxyl group containing acrylic monomer with copolymerizable acrylic and/or non-acrylic monomers.

Isocyanato group-containing acrylic resins may be produced by polymerizing isocyanato group-containing acrylic monomers such as (meth)acryloylisocyanate or 2-isocyanatoethyl (meth)acrylate, or copolymerizing the isocyanato group-containing acrylic monomer with copolymerizable acrylic and/or non-acrylic monomers.

Carboxyl group-containing acrylic resins may be produced by polymerizing (meth)acrylic acid and/or other carboxylic acid monomers such as itaconic or maleic acid, or copolymerizing the carboxylic acid monomer with copolymerizable acrylic and/or non-acrylic monomers.

Likewise epoxide group-containing acrylic resins may be produced by polymerizing epoxide group-containing acrylic monomers such as glycidyl (meth)acrylate, or copolymerizing the epoxide group-containing acrylic monomer with copolymerizable acrylic and/or non-acrylic monomers.

Examples of isocyanates having an alkenyl function to be reacted with hydroxyl group-containing acrylic resins include (meth)acryloylisocyanate, 2-isocyanatoethyl (meth) acrylate, or allylisocyanate. Examples of carboxylic acid anhydrides having an alkenyl function to be reacted with hydroxyl group-containing acrylic resins include itaconic anhydride, maleic anhydride or tetrahydrophthalic anhydride. Examples of olefin alcohols to be reacted with isocyanate group-containing acrylic resins include allyl alcohol, 3-buten-1-ol, 2-allyloxyethanol, glycerine diallyl ether, cyclohexenemethanol, 3-methyl-2-buten-1-ol, 3-methyl-3-buten-1-ol, 2-methyl-3-butene-2-ol, oleyl alcohol, crotyl alcohol and the like. Examples of olefin carboxylic acids to be reacted with epoxide group-containing acrylic resins include allylacetic, (meth)acrylic, 2-butenoic, 3-butenoic, crotonic, undecylic or linoleic acid.

Alkenyl group-containing polyester resins may be produced by the polycondensation reaction of the above-mentioned olefin alcohols, a polyol component and a polycarboxylic acid component. Examples of polyols usable in the polycondensation reaction include ethylene glycol, propylene glycol, 1, 6-hexanediol, diethylene glycol, neopentyl glycol, neopentyl glycol hydroxypivalate, trimethylolpropane, alcoholic hydroxyl group-terminated dimethylsiloxane and the like. Examples of polycarboxylic acids include phthalic anhydride, isophthalic acid, terephthalic acid, adipic acid, azelaic acid, trimellitic acid and the like. A small proportion of monoalcohols or monocarboxylic acids may be incorporated as desired. Alternatively, alkenyl group-containing polyester resins may be produced by reacting a carboxyl group-terminated polyester derived from the above-mentioned polyol and polycarboxylic acid components with an alkenyl group-containing epoxide compound, or reacting a hydroxyl group-terminate polyester with an isocyanate or acid anhydride having an alkenyl function.

Alkenyl group-containing epoxy resins may be produced by reacting, for example, bisphenol A diglycidyl ether with an olefin carboxyl acid as exemplified above, or reacting a hydroxy group-containing epoxy resin with an isocyanate or acid anhydride having the alkenyl function also as exemplified above.

Alkenyl group-containing polyether resins may be produced by the ring opening polymerization of an alkenyl group-containing epoxide using an active hydrogen compound such as water or mono- or polyols as an initiator. A ring opening polymerization product of allyl glycidyl ether initiated with ethylene glycol and a ring opening polymerization product of vinylcycloxane-1, 2-epoxide initiated with butanol are commercially available as SANTLINK XI-100 (number average M.W. 1660, Monsanto) and HPE-1030 (number average M.W. 800, Daicel Chemical Industries, Ltd.) respectively. HPE-1030 or like polymers are preferable when a coating film having increased mechanical properties are desired.

The above alkenyl group-containing acrylic, polyester, epoxy or polyether resins to be used as component (a) in this invention should have a number average molecular weight from 400 to 100,000, preferably from 800 to 50,000. This is because if the molecular weight is too low, the resin is deficient in film-forming property or the resulting film is not strong enough. Conversely if the molecular weight is too high, the resin is too viscous to give an acceptable workability or a high solids composition.

The organohydrogenpolysiloxane component (b) of this invention should have at least two silicon-hydrogen bonds in the molecule. The component (b) acts as a crosslinker of component (a) through the hydrosilylation reaction of the alkynyl group possessed by component (a). Included in usable organohydrogenpolysiloxanes are those represented by one of the following formulas (I), (II) and (III).

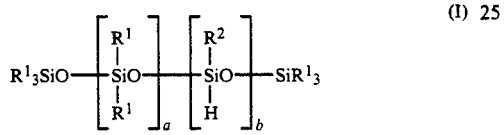
(I)

wherein $R^1$ and $R^2$ are each a $C_1$-$C_6$ alkyl or phenyl, a is zero or an integer up to 100, and b is an integer from 2 to 100.

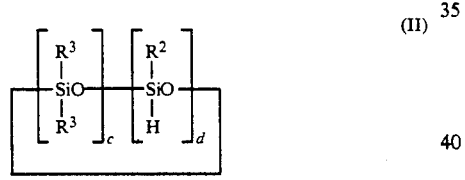
(II)

wherein $R^2$ is as defined, $R^3$ is the same as $R^2$, c is zero or an integer up to 8, d is an integer from 2 to 10, and the sum of c+d equals 3 to 10.

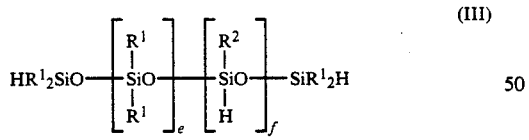
(III)

wherein $R^1$ and $R^2$ are as defined, e is an integer from 2 to 100, and f is zero or an integer up to 100.

While the $C_1$-$C_6$ alkyl group may by methyl, ethyl, propyl, butyl or the like, methyl and propyl are preferable from a commercial point of view. Phenyl is preferable as the substituent $R^1$, $R^2$ or $R^3$ because its presence renders component (b) more compatible with component (a). The degree of polymerization of polysiloxanes (I), (II) and (III) are defined by the recurring numbers a-f, respectively. If the degree of polymerization is too high, component (b) becomes too viscous to exhibit a satisfactory workbility and less compatible with component (a).

Preferable component (b) includes methylhydrogenpolysiloxanes, methylpropylhydrogenpolysiloxanes and methylphenylhydrogenpolysiloxanes. Non-limiting specific examples thereof are listed below.

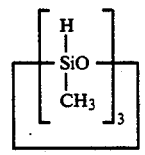

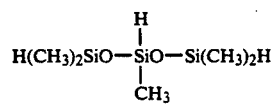

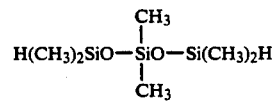

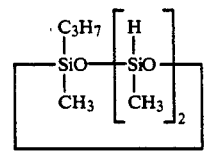

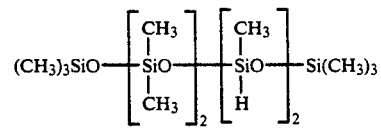

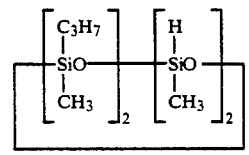

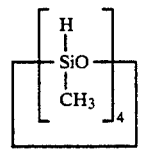

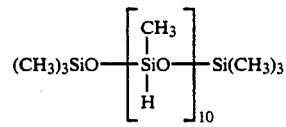

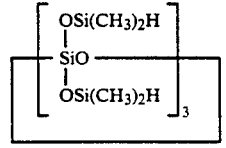

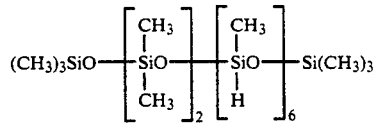

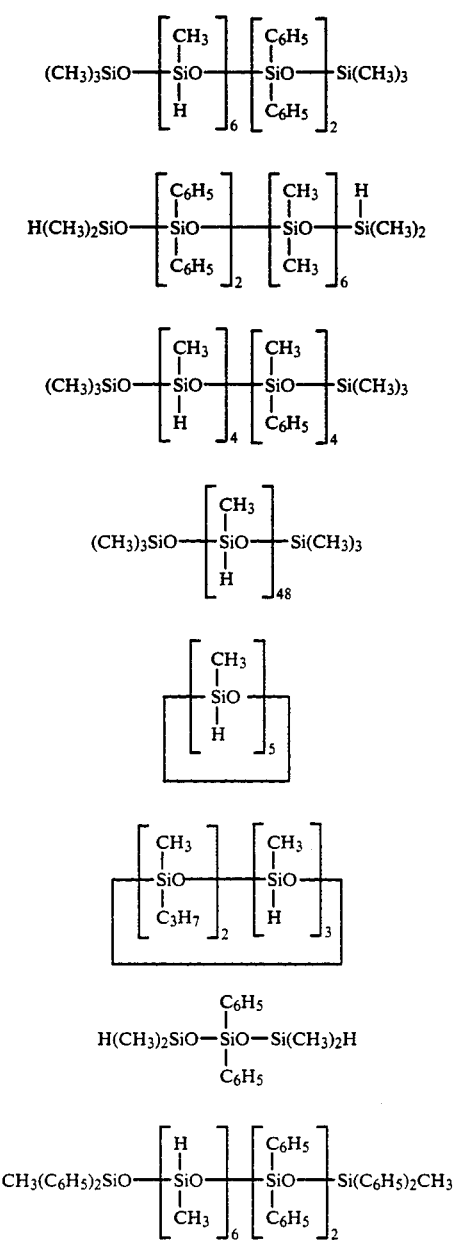

The alkynyl group-containing polymer or resin used in the present invention as component (c) acts as hydrosilyation reaction modulator. Namely, it inhibits the reaction between components(a) and (b) at room temperature by complexing the hydrosilylation catalyst (d), but its inhibitory effect disappears when heated to an elevated temperature. Using this unique proterty, a one-component heat-curable resin composition having a satisfactory storage stability may be produced. Although alkynyl group-containing resins may be produced variously, for example, by the reaction of hydroxyl group-containing resins with alkynyl chloroformates or alkynoic acids, the reaction of isocyanato group-containing resins with alkynyl alcohols, the reaction of carboxyl group-containing resins with alkynyl epoxides, or the reaction of epoxide group-containing resins with alkynoic acids, alkynyl group-containing acrylic resins are preferable.

Alkynyl group-containing acrylic resins may be produced by copolymerizing an alkynyl group-containing acrylic monomer and another monomer copolymerizable therewith. Examples of alkynyl group-containing monomers include propargyl (meth)acrylate, propargyl (meth)acryloylcarbamate, 2-propargyloxycarbonyloxyethyl (meth)acrylate and the like.

Particularly preperred monomers are (meth)acrylates of a α, α-dialkylpropargyl alcohol or its ethylene oxide adducts such as 2-methyl-3-butyn-2-yl methacrylate, 3-methyl-1-pentyn-3-yl methacrylate and methacylic ester of 2-methyl-3-butyn-2-ol-ethylene oxide adduct. These alkynyl group-containing monomers may be produced, for example, by reacting (meth)acryloyl chloride with an acetylenic alcohol such as propargyl alcohol, 2-methyl-3-butyn-2-ol, 3-methyl-1-pentyn-3-ol or their ethylene oxide adducts, transesterifying a lower alkyl (meth)acrylate with an acetylenic alcohol, reacting (meth)acryloylisocyanate with an acetylenic alcohol, or reacting 2-hydroxyethyl (meth) acrylate with propargyl chloroformate. Examples of comonomers usable in the copolymerization with the alkynyl group-containing acrylic monomers are the same as those described in connection with the alkenyl group-containing acrylic resins (a).

Instead of using components (a) and (c) separately, resins containing both of a plurality of alkenyl group and a plurality of alkynyl groups may be used. These resins may be produced by polymerizing a mixture of an alkenyl group-containing acrylic monomer and an alkynyl group-containing acrylic monomer optionally including a copolymerizable monomer.

Component (d) is added as a catalyst of the hydrosilylation reaction of component (b). Platinum catalyst having a valency of zero or 4. or equivalent Group VIII transitional metal catalysts may be used. Chloroplatinic acid is preferable from the commercial point of view. Other usable platinum catalysts include platinum-vinylsiloxane complex Ptx (ViMe$_2$SiOSiMe$_2$Vi)y (Vi=vinyl, Me=methyl), platinum-phosphine complex Pt(PPh$_3$)$_4$(Ph=phenyl), platinum phosphine complex Pt[(Ph$_3$)$_4$], or dicarbonyl-platinum dichloride. Examples of non-platinum catalysts are RhCl(PPh$_3$)$_3$, RhCl$_3$, Rh/Al$_2$O$_3$, [RhClcod]$_2$ (cod=cyclooctadiene), FeCl$_3$, PdCl$_3$.2H$_2$O, NiCl$_2$, TiCl$_4$ and the like. Using these catalysts, the composition of this invention may be cured at a relatively low baking temperature with no or little volumetric shrinkage.

The proportions of component (b) relative to component (a) and component (c) in the composition of this invention are such that 0.5 to 4, preferably 0.8 to 1.5 atoms of the hydrogen atom attached to the silicon atom are present for each of alkenyl and alkynyl groups. The amount of catalyst (d) ranges between 5 and 2,000 ppm, preferably between 10 and 500 ppm relative to 100 parts by weight of the sum of solids of components (a), (b) and (c). Care should be taken that excessive addition of catalyst (d) may decrease the storage stability of the composition.

The following examples are given for illustrative purposes only. All parts and percent therein are by weight unless otherwise specified.

PRODUCTION EXAMPLE 1

A reactor was charged with 550 parts of benzene, 74 parts of pyridine and 65.5 parts of 2-methyl-3-butyn-2-ol. To this were added 90 parts of methacryl chloride dropwise over one hour while keeping the inner temperature at 20° C. Then the reaction mixture was kept at 50° C. for 6 hours, suction filtered, evaporated and distilled in vacuo. 2-Methyl-3-butyn-2-yl methacrylate boiling at 56°–58° C./12 mmHg was obtained in a yield of 62% of theory. The product was identified by the IR spectrum thereof.

PRODUCTION EXAMPLE 2

A reactor was charged with 100 parts of SOLVESSO 100 and heated to 120° C. To this was added a mixture of 30 parts of styrene, 20 parts of t-butyl methacrylate, 50 parts of 2-methyl-3-butyn-2-yl methacrylate and 5 parts of 2,2'-azobis(2-methylbutyronitrile) over 3 hours, and allowed to react at the same temperature for additional 30 minutes. Then a solutions of 5 parts of 2,2'-azobis(2-methylbutyronitrile) in 20 parts of SOLVESSO 100 was added dropwise over 30 minutes. Mixture was allowed to react for additional 2 hours at the same temperature. A solution of alkynyl group-containing acrylic resin having a solids content of 42.0% and a viscosity of 26 centripoise was obtained. The number average molecular weight of the resin measured by the GPC method was 2,460.

PRODUCTION EXAMPLE 3

A reactor was charged with 60 parts of xylene and heated to 105° C. To this was added a mixture of 40 parts of 2-Propargyloxycarbonyloxyethyl methacrylate, 30 parts of methyl methacrylate, 30 parts of 2-ethylhexyl methacrylate and 1.2 parts of t-butylperoxy 2-ethylhexanoate dropwise over 3 hours. After the addition, the mixture was allowed to react for additional 30 minutes. Then 0.5 parts of t-butylperoxy 2-ethylhexanoate in 6.7 parts of xylene were added dropwise thereto over 30 minutes and the reacting was continued for additional 2 hours. A solution of alkynyl group-containing acrylic resin having a solids content of 60.2% and a viscosity of 120 centipoise was obtained. The number average molecular weight of the resin was 10,500.

PRODUCTION EXAMPLE 4

A reactor was charged with 50 parts of SOLVESSO 100 and heated to 120° C. To this was added a mixture of 20 parts of styrene, 40 parts of 3-methyl-3-butenyl methacrylate, 40 parts of 2-methyl-3-butyn-2-yl methacrylate and 5 parts of 2,2'-azobis(2-methylbutyronitrile) dropwise over 3 hours and allowed to react for additional 30 minutes. After the addition of 0.5 parts of 2,2'-azobis(2-methylbutyronitrile) in 17 parts of SOLVESSO 100 over 30 minutes, the mixture was allowed to react for additional 2 hours. An acrylic resin containing both alkynyl and alkenyl groups was obtained as a solution having a solids content of 59.0 % and a viscosity of 580 centipoise. The number average molecular weight was 4,320.

PRODUCTION EXAMPLE 5

A reactor was charged with 90 parts of SOLVESSO 100 and heated to 120° C. To this was added 100 parts of 2-butenyl methacrylate containing 5 parts of 2,2'-azobis(2-methylbutyronitrile) dropwise over 3 hours and then allowed to react for additional 30 minutes. After the addition of 0.5 parts of 2,2'-azobis(2-methylbutyronitrile) in 4.5 parts of SOLVESSO 100 over 30 minutes, the mixture was allowed to react again for additional 2 hours. The resulting polymer was precipitated by adding a large amount of methanol to the solution. The precipitate was dried and redissolved in xylene to a nonvolatile content of 55%. A solution of poly(2-butenyl methacrylate) having a solids content of 54.8% and a viscosity of 250 centipoise was obtained. The number average molecular weight was 9,940.

PRODUCTION EXAMPLE 6

A reactor was charged with 58 parts of xylene and heated to 110° C. To this was added a mixture of 50 parts of cyclohexenylmethyl methacrylate, 20 parts of methyl methacrylate, 15 parts of t-butyl methacrylate, 15 parts of 2-ethylhexyl methacrylate and 1.2 parts of t-butylperoxy 2-ethylhexanoate dropwise over 3 hours and allowed to react for additional 30 minutes. After the addition of 0.2 parts of t-butylperoxy 2-ethylhexanoate in 20 parts of xylene dropwise over 30 minutes, the mixture was allowed to react again for additional 2 hours. A solution of alkenyl group-containing acrylic resin having a solids content of 58.0 % and a viscosity of 20 poise was obtained. The number average molecular weight of the resin was 11,500.

PRODUCTION EXAMPLE 7

A reactor was charged with 90 parts of SOLVESSO 100 and heated to 120° C. To this was added a mixture of 50 parts of 3-methyl-3-butenyl methacrylate, 30 parts of styrene, 20 parts of t-butyl methacrylate and 5 parts of 2,2'-azobis(2-methylbutyronitrile) dropwise over 3 hours and allowed to react for additional 30 minutes. After the addition of 0.5 parts of 2,2'-azobis(2-methylbutyronitrile) in 10 parts of SOLVESSO 100 dropwise over 30 minutes, the mixture was allowed to react again for additional 2 hours. After the reaction, the reaction mixture was evaporated in vacuo at 90° C. to obtain a solution having a solids content of 69.9 and a viscosity of 110 poise. The number average molecular weight of the resin was 6,500.

PRODUCTION EXAMPLE 8

Production Example 7 was repeated except that 30 parts of styrene were replaced by 30 parts of SIRAPRENE FM-0711 (dimethylsilicone macromonomer, M.W. 1,000, Chisso Corporation). A solution of alkenyl group-containing acrylic resin having a solids content of 52.3% and a viscosity of 17 poise was obtained. The number average molecular weight of the resin was 6,500.

PRODUCTION EXAMPLE 9

A reactor was charged with 100 parts of xylene and heated to 130° C. To this was added dropwise a mixture of 40 parts of allyl methacrylate, 40 parts of t-butyl methacrylate, 20 parts of 2,4-diphenyl-4-methyl-1-pentene and 10 parts of t-butylperoxy 2-ethylhexanoate over 3 hours and allowed to react for additional 30 minutes. After the addition of 0.5 parts of t-butylperoxy 2-ethylhexanoate in 10 parts of xylene dropwise over 30 minutes, the mixture was allowed to react again for additional 2 hours. The resulting polymer was precipitated by the addition of a large amount of methanol, dried and redissolved in xylene to give a solution having a solids content of 50.3% and a viscosity of 32 poise. The number average molecular weight of the resin was 28,800.

PRODUCTION EXAMPLE 10

A reactor was charged with 45 parts of SOLVESSO 100 and heated to 110° C. To this was added a mixture of 80 parts of CYCLOMER MF-401(a 1:1 adduct of 2-hydroxyethyl methacrylate and vinylcyclohexene monoepoxide sold by Daicel Chemical Industries, Ltd.), 30 parts of styrene, 20 parts of t-butyl methacrylate, 20 parts of ethyl acetate and 5 parts of 2,2'-azobis(2-methylbutyronitrile) dropwise over 3 hours and allowed to react for additional 30 minutes. After the addition of 0.5 parts of 2,2'-azobis(2-methylbutyronitrile) in 1 part of SOLVESSO 100, the mixture was allowed to react again for additional 2 hours. A solution of alkenyl group-containing resin having a solids content of 64.2% and a viscosity of 109 poise was obtained. The number average molecular weight of the resin was 7,370.

PRODUCTION EXAMPLE 11

A reactor equipped with a decanter was charged with 42.2 parts of dimethyl terephthalate, 15.1 parts of neopentyl glycol hydroxypivalate, 6.6 parts of trimethylpropane, 36.9 parts of hydroxyl-terminated polysiloxane X-22-160AS(M.W.900, Shin-Etsu Chemical Co., Ltd.), and 0.05 parts of dibutyltin oxide. The reactants were initially heated to 150° C. Then the temperature was gradually raised to 220° C. over 10 hours to proceed with a transesterification reaction until 10 parts of methanol were recovered. Thereafter the reaction mixture was allowed to cool to 100° C. and 12.5 parts of glycerine diallyl ether were added thereto. Then the temperature was raised again to 220° C. over 2 hours and maintained this temperature for additional 2 hours. A total of 13 parts of methanol was separated. After the reaction, 66 parts of xylene were added to the reaction product. A solution of alkenyl group-containing polyester resin having a solids content of 57.7% and a viscosity of 240 centipoise was obtained. The number average molecular weight of the resin was 2,500.

PRODUCTION EXAMPLE 12

A reactor was charged with 35.5 parts of bisphenol A diglycidyl ether and heated to 120° C. To this was added dropwise a mixture of 17.2 parts of 3-butenoic acid and 0.1 parts of dimethylbenzylamine over 1 hour and allowed to react for additional 2 hours. The reaction product was diluted with a mixture of 30 parts of xylene and 5 parts of methyl isobutyl keton. A solution of alkenyl group-containing modified epoxy resin having a solid contents of 59.3% and a viscosity of 260 centipoise was obtained. The number average molecular weight of the resin was 1,200.

EXAMPLES 1-11 AND COMPARATIVE EXAMPLES 1-2

Various compositions were formulated as shown in Tables 1-3 and tested for their viscosities before and after the storage in a closed container at 40° C. for 10 days using a type E viscometer sold by Tokyo Keiki, Co., Ltd. After the storage test, each composition was applied onto a steel plate to a dry film thickness of 20 micron and baked at 140° C. for 30 minutes. The resulting cured film was evaluated in terms of the pencil hardness test according to JIS K 5400 and the xylene rubbing test in which the film was rubbed with a cotton wool piece impregnated with xylene at 50 reciprocations and the change of appearance if any was obserbed visually. The results of these tests are collectively shown in Tables 4-6.

TABLE 1

| Formulation (parts) | | | | | |
|---|---|---|---|---|---|
| | Example | | | | |
| | 1 | 2 | 3 | 4 | 5 |
| Component (a) | | | | | |
| Production Ex. 5 | 91.2 | | | | |
| Production Ex. 6 | | 103 | | | |
| Production Ex. 7 | | | 81.5 | | |
| Production Ex. 8 | | | | 153 | |
| Production Ex. 9 | | | | | 109 |
| Component (b) | | | | | |
| Hydrogenpolysiloxane A[1] | 50 | 40 | 43 | | 45 |
| Hydrogenpolysiloxane B[2] | | | | 20 | |
| Component (c) | | | | | |
| Production Ex. 2 | 21.3 | 21.3 | 14.2 | 7.1 | 5.0 |
| Component (d) | | | | | |
| Chloroplatinic acid catalyst A[3] | 1.5 | 1.5 | 1.0 | 0.5 | 0.5 |
| Solids (%) | 65.0 | 66.2 | 76.3 | 57.2 | 63.1 |

TABLE 2

| Formulation (parts) | | | | | | |
|---|---|---|---|---|---|---|
| | Example | | | | | |
| | 6 | 7 | 8 | 9 | 10 | 11 |
| Component (a) | | | | | | |
| Production Ex. 9 | 120 | | | | | |
| Production Ex. 10 | | 109 | | | | |
| Production Ex. 4 | | | 120 | | | |
| Production Ex. 11 | | | | 80 | | |
| Production Ex. 12 | | | | | 50 | |
| SANTLINK X1-100[5] | | | | | | 43 |
| Component (b) | | | | | | |
| Hydrogenpolysiloxane A[1] | 23 | 40 | 31 | 20 | 50 | 57 |
| Component (c) | | | | | | |
| Production Ex. 2 | | 10.0 | 12.0 | 2.5 | 21.4 | 5.8 |
| Production Ex. 3 | 15.0 | | | | | |
| Component (d) | | | | | | |
| Chloroplatinic acid catalyst A[3] | | 1.0 | 1.2 | 0.1 | 1.5 | 0.4 |
| Chloroplatinic acid catalyst B[4] | 1.5 | | | | | |
| Solids (%) | 67.4 | 67.7 | 67.1 | 48.2 | 78.6 | 97.2 |

TABLE 3

| Formulation (parts) | | | |
|---|---|---|---|
| | Comparative Example | | |
| | 1 | 2 | 3 |
| Component (a) | | | |
| Production Ex. 5 | | | 91.5 |
| HPE-1030[6] | 50 | 50 | |
| Component (b) | | | |
| Hydrogenpolysiloxane A[1] | 50 | 50 | 50 |
| Component (c) | | | |
| Modulator A[7] | 4.5 | | |
| Modulator B[8] | | 3.9 | 3.9 |
| Component (d) | | | |
| Chloroplatinic acid catalyst A[3] | 1.5 | 1.5 | 1.5 |

TABLE 3-continued

| Formulation (parts) | | | |
|---|---|---|---|
| | Comparative Example | | |
| | 1 | 2 | 3 |
| Solids (%) | 95.3 | 92.0 | 66.0 |

Footnotes
1)
$$(CH_3)_3Si(OSi)_6(OSi)_2OSi(CH_3)_3$$
with CH₃ and H groups on one Si, C₆H₅ and C₆H₅ groups on the other Si.

2) Methylhydrogenpolysiloxane SH-1107 sold by Toray Dow Corning Co., Ltd.
3) 2% toluene solution of the reaction product of divinyltetramethyldisiloxane and chloroplantinic acid hexahydrate.
4) 2% isoprapanol solution of chloroplatinic acid hexahydrate.
5) Polymer of allyl glycidyl ether of a number average M.W. of 1,660 sold by Monsanto.
6) Polymer of vinylcyclohexane-1,2-epoxide having a number M.W. of 800 sold by Dainel Chemical Industries, Ltd.
7) 3-Trimethylsiloxy-3-methyl-1-butyne.
8) Benzothiazol.

TABLE 4

Storage Stability and Film Property

| Viscosity, CPS | 1 | 2 | 3 | 4 | 5 |
|---|---|---|---|---|---|
| Initial | 62 | 68 | 480 | 89 | 82 |
| After storage at 40° C., 10 days | 66 | 70 | 560 | 90 | 88 |
| Film property | | | | | |
| Xylene rubbing test | No Change | No Change | No Change | No Change | No Change |
| Pencil hardness | HB | H | H | H | B |

TABLE 5

Storage Stability and Film Property

| Viscosity, CPS | Example | | | | | |
|---|---|---|---|---|---|---|
| | 6 | 7 | 8 | 9 | 10 | 11 |
| Initial | 310 | 105 | 92 | 51 | 46 | 65 |
| After storage at 40° C., 10 days | 390 | 115 | 99 | 52 | 54 | 70 |
| Film property | | | | | | |
| Xylene rubbing test | No Change | No Change | No Change | No Change | No Change | No Change |
| Pencil hardness | H | HB | H | H | H | 3B |

TABLE 6

Storage Stability and Film Property

| Viscosity, CPS | Comparative Example | | |
|---|---|---|---|
| | 1 | 2 | 3 |
| Initial | 36 | 45 | 62 |
| After storage at 40° C., 10 days | Gel | Gel | Gel |
| Film property | | | |
| Xylene rubbing test | — | — | — |
| Pencil hardness | — | — | — |

We claim:

1. A curable resin composition comprising:
   (a) an acrylic, epoxy, polyester or polyether polymer having a plurality of alkenyl groups in the molecule and a number average molecular weight of from 400 to 100,000;
   (b) an organohydrogenpolysiloxane having a plurality of silicone-hydrogen bonds in the molecule;
   (c) an acrylic polymer having a plurality of alkynyl groups in the molecule and a number average molecular weight of from 400 to 100,000; and
   (c) a catalytically effective amount of a hydrosilylation catalyst.

2. The curable resin composition according to claim 1, wherein said alkenyl group-containing acrylic polymer is a homopolymer of an alkenyl group-containing acrylic monomer or a copolymer of an alkenyl group-containing monomer with another monomer copolymerizable therewith.

3. The curable resin composition according to claim 1, wherein said alkenyl group-containing polyester polymer is a reaction product of a carboxyl group-terminated polyester resin with an alkenyl group-containing epoxy compound.

4. The curable resin composition according to claim 1, wherein said alkenyl group-containing epoxy polymer is a reaction product of an epoxy resin with an alkenoic acid.

5. The curable resin composition according to claim 1, wherein said alkenyl group-containing polyether polymer is a polymer produced by addition polymerizing an alkenyl group-containing epoxy compound initiated by an active hydrogen compound.

6. The curable resin composition according to claim 1, wherein said alkynyl group-containing polymer is a homopolymer of an alkynyl group-containing acrylic monomer or a copolymer of said alkynyl group-containing monomer with another monomer copolymerizable therewith.

7. The curable resin composition according to claim 6, wherein said alkynyl group-containing acrylic monomer is the acrylic or methacrylic ester of an α, α-dialkylpropargyl alcohol or an alkylene oxide adduct thereof.

8. The curable resin composition according to claim 7, wherein said ester is 2-methyl-3-butyn-2-yl methacrylate or 3-methyl-1-pentyn-3-yl methacrylate.

9. The curable resin composition according to claim 1, wherein said organohydrogenpolysiloxane has the formula:

$$R^1{}_3SiO{-}\left[\begin{array}{c}R^1\\|\\SiO\\|\\R^1\end{array}\right]_a\left[\begin{array}{c}R^2\\|\\SiO\\|\\H\end{array}\right]_b SiR^1{}_3$$

wherein $R^1$ and $R^2$ are each a $C_1$–$C_6$ alkyl or phenyl, a is zero or an integer up to 100, and b is an integer from 2 to 100.

10. The curable resin composition according to claim 1, wherein said organohydrogenpolysiloxane has the formula:

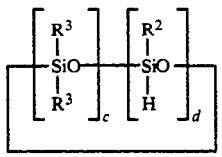

wherein $R^2$ is $C_1$–$C_6$ alkyl or phenyl, $R^3$ is the same as $R^2$, c is zero or an integer up to 8, d is an integer from 2 to 10, and the sum of c+d equals 3 to 10.

11. The curable resin composition according to claim 1, wherein said organohydrogenpolysiloxane has the formula:

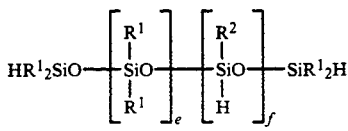

wherein $R^1$ and $R^2$ are $C_1$–$C_6$ alkyl or phenyl, e is an integer from 2 to 100, and f is zero or an integer up to 100.

12. The curable resin composition according to claim 1, wherein said organohydrogenpolysiloxane has the formula:

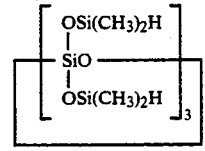

13. The curable resin composition according to claim 1, wherein said hydrosilylation catalyst is chloroplatinic acid.

14. The curable resin composition according to claim 1, wherein the proportions of said component (a), component (b) and component (c) in said composition is such that 0.5 to 4 atoms of the hydrogen atom attached to the silicon atom are present for each of the alkenyl and alkynyl groups.

15. The curable resin composition according to claim 1, wherein said component (d) is present in said composition an amount between 5 to 1,000 ppm relative to 100 parts by weight of the sum of solids of component (a), component (b) and component (c).

* * * * *